(12) United States Patent
Reimerdes

(10) Patent No.: US 6,214,406 B1
(45) Date of Patent: Apr. 10, 2001

(54) METHOD OF MAKING AN EXTRUDED INSTANT GRANULAR FOOD PRODUCT

(75) Inventor: Ernst H. Reimerdes, Cully/Villette (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/125,090

(22) PCT Filed: Feb. 6, 1997

(86) PCT No.: PCT/EP97/00530

§ 371 Date: Aug. 6, 1998

§ 102(e) Date: Aug. 6, 1998

(87) PCT Pub. No.: WO97/28705

PCT Pub. Date: Aug. 14, 1997

(30) Foreign Application Priority Data

Feb. 7, 1996 (EP) .................................................. 96810080

(51) Int. Cl.[7] .................................................... A23L 1/48
(52) U.S. Cl. ........................ 426/601; 426/516; 426/519; 426/580; 426/654; 426/658
(58) Field of Search ..................... 426/580, 654, 426/516, 519, 601, 658

(56) References Cited

U.S. PATENT DOCUMENTS

| 4,532,146 | 7/1985 | Durand et al. | 426/580 |
| 5,451,421 | 9/1995 | Tanihara et al. | 426/589 |
| 5,888,564 | * 3/1999 | Fontana | 426/516 |

FOREIGN PATENT DOCUMENTS

| 0490082 A1 | 6/1992 | (EP) . |
| 0509748 A1 | 10/1992 | (EP) . |
| 0594152 A3 | 4/1994 | (EP) . |

OTHER PUBLICATIONS

Database WPI Week 7315 1973, Derwent Publications Ltd., London, GB; AN 73–20995u XP002005986, & JP 48 011 031 B (Teijin) see abstract.

Database WPI Week 8701 1987 Derwent Publications Ltd., London, GB; AN 87–002389, XP002005987 & JP 61 260 837 A (Shokuhin Sangyo Extrusion).

* cited by examiner

Primary Examiner—Helen Pratt
(74) Attorney, Agent, or Firm—Pennie & Edmonds LLP

(57) ABSTRACT

A process for the production of a free flowing and instantly dispersible and/or soluble granular food product, which comprises preparing a mix of an oil or fats and powdery carbohydrates and/or protein rich materials in an extruder, plasticizing the mix in the extruder and forming the mix into granules by extruding the plasticized mix in strands and cutting the strands.

7 Claims, No Drawings

METHOD OF MAKING AN EXTRUDED INSTANT GRANULAR FOOD PRODUCT

TECHNICAL FIELD

The present invention relates to a process for the production of a free flowing and instantly dispersible and/or soluble granular food product.

BACKGROUND OF THE INVENTION

DD-A-248502 (Institut für Getreideverarbeitung) discloses a process for the production of instant sauces or soups in the form of granules by preparing a powdery or doughlike mixture of protein hydrolysate, meat or vegetable material, instant flour or semolina, salt, sugar and spices, granulating it with a press or with an extruder, fluidised bed coating the granules with oil, carbohydrates or gums and drying them.

GB-A-2131271 (Institut für Getreideverarbeitung) discloses a process for the production of a granulated food based on milk or other animal or vegetable proteins, carbohydrates, fats and minerals which comprises mixing powdery components in a fluidised bed and spraying a liquid mix of the remaining components into the powdery components, the powdery material being coated and agglomerated by the sprayed material and dried simultaneously in the fluidized bed.

U.S. Pat. No. 5,332,585 (Odermatt et al.) discloses a process for preparing a granular food product by mixing a molten fat with an amylaceous material, extruding the mixture in strands, cooling the strands, subdividing them into sections and projecting the sections through a grill to reduce them into granules.

SUMMARY OF THE INVENTION

The problem addressed by the present invention was to provide a novel and simple process for the production of a free flowing and instantly dispersible and/or soluble granular food product from carbohydrates, proteins, and oil or fats.

To this end, the process according to the present invention comprises preparing a mix of an oil or fats and powdery carbohydrates and/or protein rich materials in an extruder, plasticizing the mix in the extruder and forming the mix into granules by extruding the plasticised mix in strands and cutting the strands.

The process according to the present invention indeed enables a free flowing granular food product to be produced from carbohydrates, proteins, and oil or fats which is instantly dispersible and/or soluble in warm or boiling water and which is thus suitable for the preparation of instant food in pap or liquid form.

DETAILED DESCRIPTION OF THE INVENTION

Throughout the present specification and claims the expression "stable emulsion" means that a fat phase is predominantly present in form of small globules homogeneously dispersed in a liquid phase without any phase separation being observed.

The term "desintegrant" means a food grade desintegrating agent which is able to desintegrate the granules dispersed in water, by way of a capillarity effect, as far as the desintegrant containing granules were compacted to a certain extent during forming.

The present process may start from carbohydrates, proteins and/or oil or fats in form of the components of an animal or vegetable material, such as milk solids, cereal flour or soya flour, and/or in form of individual components, such as starch, polysaccharides, maltodextrines, saccharose, lactose, glucose, egg proteins, gluten, protein concentrates or protein isolates from milk, whey or soya, triglycerides of animal or vegetable origin, milk fat, palm oil, palm olein, coconut oil, or rape seed oil.

Thus, it is possible to prepare a mix which comprises, in part by weights, from 5 to 95 parts, preferably from 30 to 70 parts of carbohydrates, up to 40 parts, preferably from 15 to 30 parts of proteins, and up to 80 parts, preferably from 5 to 40 parts of oil or fats.

The following components may be added before and/or after preparing said mix:

up to 25 parts, preferably up to 15 parts of water, up to 5 parts, preferably up to 0.6 part of emulsifier, such as lecithin, mono- and/or diglycerides, up to 3 parts, preferably up to 1 part of desintegrants, such as modified starches, carboxymethylcellulose (CMC), formaldehyde-casein and other modified proteins, up to 3 parts, preferably up to 1 part of stabilizers, such as pectine, xanthan and other gums, and, optionally, vitamins, micronutrients and/or antioxidants.

For preparing said mix in an extruder, it is possible to prepare an emulsion from an oil, water and an emulsifier, and to introduce simultaneously or successively the emulsion and the powdery materials into the extruder.

Alternatively it is possible to prepare a mixture of an oil or fats and powdery carbohydrates, prepare an aqueous emulsion of an oil and powdery protein materials, and introduce simultaneously or successively the mixture and the emulsion into the extruder.

The extruder may be a single screw or a twin screw extruder such as a MAPIMPIANTI or WENGER single screw extruder, or a BUHLER, WENGER, CLEXTRAL or WERNER & PFLEIDERER twin screw extruder, or a READCO type TELEDYNE or AOUSTIN twin screw mixer.

The temperature may be adjusted in different zones of the extruder in function of the work which is to be carried out in these zones, namely mixing (room temperature), fat melting (above about 55° C.), plasticising and/or starch gelatinizing (from about 120° C. to about 180° C.). The pressure may be adjusted accordingly from above atmospheric pressure (mixing, fat melting) up to between about 200 kPa and about 10 MPa (plasticising, starch gelatinising, extruding), the residence time within the extruder possibly being from about 2 s to about 2 min.

The plasticised mixture may be extruded in strands through a die such as a plate having circular openings from about 1 to 3 mm in diameter.

The extruded strands may be cut into granules from about 2 to 5 mm in length.

The granules thus obtained may then be dried to a residual content of between about 1 to 5%, preferably between about 2 to 3.5%.

These granules may have a bulk density of from about 400 to 600 g/l.

Further forming steps such as compacting and/or spheronising may be provided for, so that the bulk density of the granules be increased up to values between about 500 and 1000 g/l.

An embodiment of the process according to the present invention is illustrated in the following Example in which percentages and parts are by weight.

EXAMPLE

An emulsion was prepared which contained 20 parts water, 15 parts palm olein, 15 parts skimmed milk powder and 0.6 part lecithin.

This emulsion was fed into a twin screw extruder together with 25 parts of skimmed milk powder, 15 parts lactose and 10 parts corn starch.

The mix prepared in this way at room temperature in a mixing zone of the extruder was then plasticised at 140° C. under 8 MPa in a mechanically compressing and shearing zone of the same extruder. The plasticised mix was extruded in strands through cylindrical openings 2 mm in diameter pierced in a die plate provided at the end of the extruder. The strands were cut into granules 5 mm in length which had a bulk density of 500 g/l.

These granules were free flowing and instantly dispersible in warm or boiling water.

What is claimed is:

1. A process for the production of a free-flowing granular food product consisting essentially of:
   preparing a mix which contains from 30 to 70 parts of a carbohydrate in powder form, from 15 to 30 parts of a protein in powder form, and from 5 to 40 parts of an oil or fat; adding before or after preparing said mix up to 25 parts water,
   an emulsifier in an amount of no more than 5 parts, a disintegrant in an amount of no more than 3 parts, and a stabilizer in an amount of no more than 3 parts; and
   plasticizing the mix by heating for between 2 seconds and 2 minutes at a temperature of between 120° C. and 180° C. and a pressure of between about 200 kPa and 10 MPa;
   extruding the plasticized mix to form strands; and
   cutting the strands into granules which are instantly dispersible in warm or boiling water.

2. The process of claim 1, wherein an emulsion from the oil or fat, water, and emulsifier is prepared and added to the carbohydrate and protein to prepare the mix.

3. The process of claim 2 wherein the soluble granular food products has a bulk density of from about 400 to about 600 grams per liter.

4. The process of claim 1 wherein a mixture of the oil or fat and carbohydrate is prepared and an aqueous emulsion of an oil and the protein is prepared before forming the mix by combining the aqueous emulsion and mixture.

5. The process of claim 1, wherein the soluble granular food products has a bulk density of from about 400 to about 600 grams per liter.

6. The process of claim 1, further comprising the step of compacting and/or spheronising, wherein the soluble granular food product has a bulk density of from about 500 to about 1000 grams per liter.

7. The process of claim 2, wherein the soluble granular food product is compacted to a bulk density of from about 500 to about 1000 grams per liter.

* * * * *

UNITED STATES PATENT AND TRADEMARK OFFICE
CERTIFICATE OF CORRECTION

PATENT NO. : 6,214,406 B1　　　　　　　　　　　　　　　　　　　Page 1 of 1
DATED　　　　: April 10, 2001
INVENTOR(S) : Reimerdes It is certified that error appears in the above-identified patent and that said Letters Patent is hereby corrected as shown below:

Column 4,
Line 11, (claim 3, line 1): change "claim 2 wherein" to -- claim 2, wherein --.
Line 12, (claim 3, line 2): change "products" to -- product --.
Line 19, (claim 5, line 2): change "products" to -- product --.

Signed and Sealed this

Thirtieth Day of October, 2001

Attest:

NICHOLAS P. GODICI
Attesting Officer　　　Acting Director of the United States Patent and Trademark Office